UNITED STATES PATENT OFFICE.

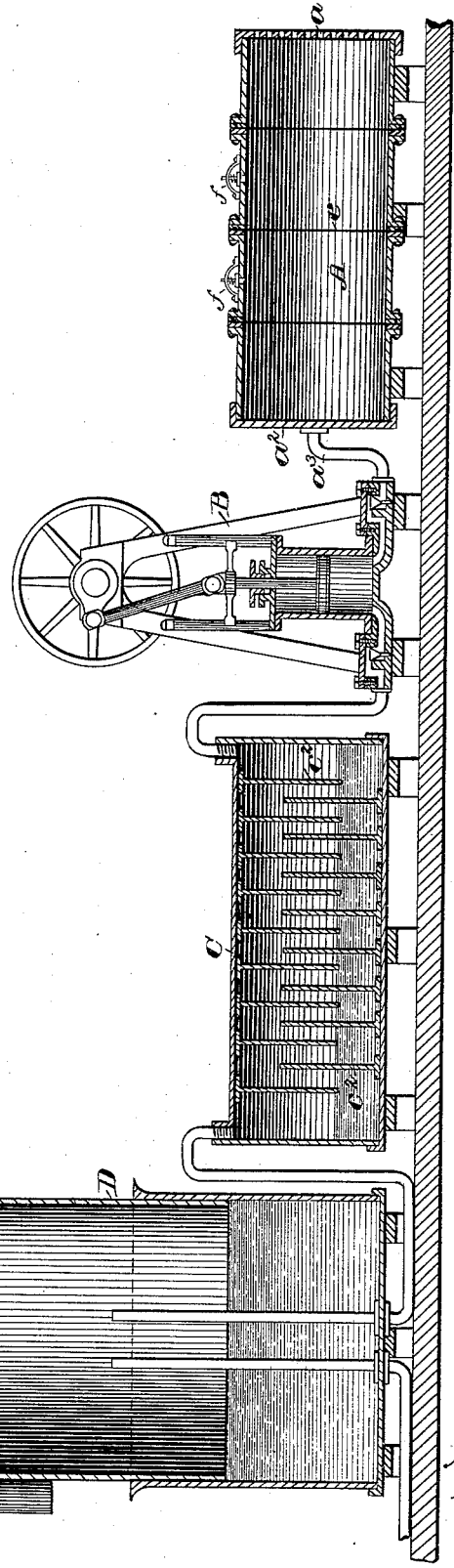

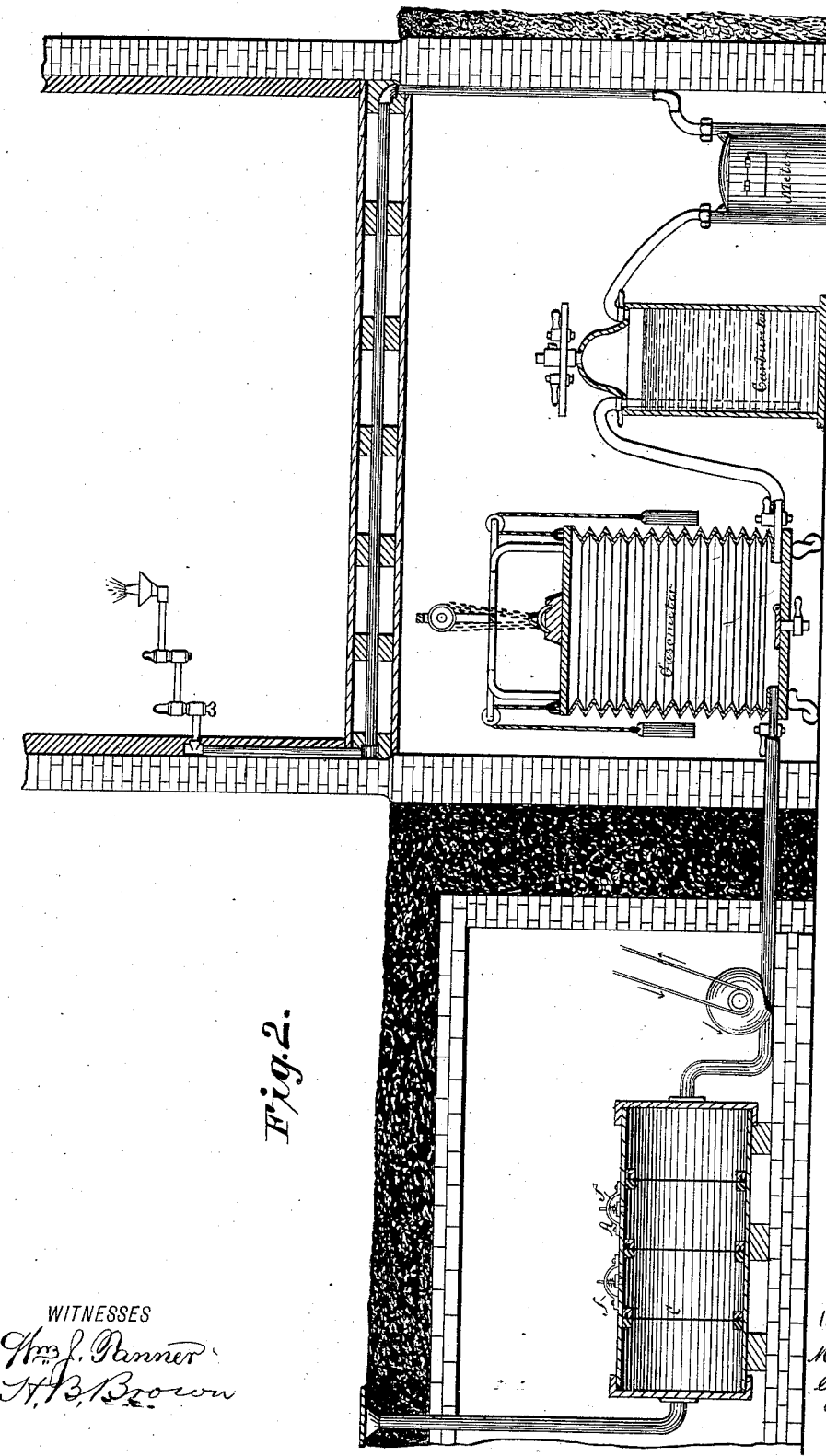

MORITZ HERZOG, OF HOBOKEN, NEW JERSEY.

PROCESS OF AND APPARATUS FOR OBTAINING ILLUMINATING-GAS.

SPECIFICATION forming part of Letters Patent No. 307,042, dated October 21, 1884.

Application filed August 21, 1883. (No model.)

*To all whom it may concern:*

Be it known that I, MORITZ HERZOG, a citizen of Austria-Hungary, residing at Hoboken, in the county of Hudson and State of New Jersey, have invented certain new and useful Improvements in Process of and Apparatus for Obtaining Illuminating-Gas; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is to produce a cheap illuminating-gas which can be burned without danger of explosion, is intensely brilliant, pleasant to the eye, and does not evolve dangerous or noxious vapors when ignited.

The invention consists in charging or impregnating a gas composed of oxygen and nitrogen in or about equal proportions with the vapors of a liquid hydrocarbon by passing the gas through a suitable carburetor containing said hydrocarbon. The gas to be carbureted and used for illuminating purposes is produced by dialyzing atmospheric air through caoutchouc or other porous membranes, which are so combined in a "battery" or apparatus that the resultant product passing from the latter is a gas or a mixture of oxygen and nitrogen in about equal proportions, the percentage of oxygen being never in excess of the nitrogen. Such a gas, when carbureted or charged with a hydrocarbon, can be used without danger of explosion, and when lighted it gives a bluish white brilliant flame, whereas the flame of ordinary carbureted air has a dull yellowish appearance, and is liable to smoke by reason of the large percentage of nitrogen it contains.

In carrying my invention into practice I make use of the dialyzing process and apparatus fully set forth in a prior application for patent filed in the United States Patent Office on the 6th day of August, 1883, and combine therewith means for carbureting the gas or dialyzed air, as will be hereinafter more fully described.

In the drawings, Figure 1 is a sectional view representing the combination of a dialyzer-exhaust and compression-pump, carburetor, and gas-holder in the relative order mentioned. Fig. 2 is a sectional view, showing the combination of a dialyzer-exhaust and compression-pump, gas-holder, and carburetor located beyond said gas-holder.

The letter A designates a cylinder or casing, which is made of metal or other suitable material of a non-porous nature. This cylinder has a perforated end head, $a$, which is made detachable, and is secured in place by flanges and bolts, or other suitable means. The other end head, $a^2$, of the cylinder is made solid, and has a discharge-pipe, $a^3$, which communicates with an exhaust and compression pump, B, as is shown in Fig. 1, or with the chamber of an exhaust fan or blower, $B^2$, illustrated in Fig. 2.

Either the pump or the rotary fan serves for exhausting the contents of the cylinder A and forcing the same into and through a carburetor, C, connected with the discharge-pipe of the pump or fan; or, if desired, the gas passing from the cylinder A may first be conducted into a holder or gasometer, D, and led therefrom into a carbureter, C', located at the point where the gas is to be consumed. This latter arrangement is illustrated in Fig. 2, whereas Fig. 1 shows the gasometer D located beyond the carburetor for receiving and storing the illuminating-gas passing from the latter. Atmospheric air enters the perforated end head of the cylinder A, and is successively drawn through a series of membranes, E, arranged within the cylinder, by means of the aforesaid pump B or blower $B^2$. The membranes are held in frames, and are made of caoutchouc or other colloid septa capable of permitting a quicker diffusion of oxygen than of nitrogen, as is clearly set forth in the prior application for patent, above referred to, in which it is stated that the air which enters the first chamber consists of $O_{21} + N_{79}$, and is caused to pass through the first membrane into the second chamber by the continuously-operating suction-pump or exhaust-fan, it being understood that the vacuum created in the beginning in the second chamber is gradually filled by the air passing from the first chamber through its membrane or septum. The air or gas present in the second chamber has gained nine per cent. of oxygen, and hence this chamber contains of oxygen thirty and one-half per cent. and nitrogen sixty-nine and one-half per cent. A further passage of the gas through a second septum into a third chamber will deprive the gas of another nine per cent. of nitrogen, and hence the gas entering said third chamber is composed of oxygen, forty per cent., and nitrogen, sixty per cent. The passage of this gas through the third septum into a fourth chamber will cause a further dialysis to take place and produce a gas which consists of oxygen and nitrogen in about equal proportions, to which I have applied the formula $N_2 O_2$, as it corresponds nearest to the same. The intermediate dialyzing-chambers are provided with suitable valves, $f$, which serve for the discharge of the nitrogen accumulating in said chambers, it being evident that the heavier incoming mixture of nitrogen and oxygen will displace the lighter nitrogen remaining in said chambers, and cause the valves to open outwardly for the discharge of the stratum of nitrogen that has existed at the tops of said chambers. Valves operating in this manner are set forth in the application for patent above alluded to.

The gas is exhausted from the dialyzer by the pump or other apparatus and is caused to pass through the carburetor C, in which it is charged with hydrocarbon vapors, or with the properties of the carbureting agent contained therein. This carburetor may be of any approved construction and contain any suitable liquid—such as petroleum, benzine, naphtha, petroleum-ether, pinoline, turpentine, or other carbureting agent, either in a liquid or gaseous form. I have in the present instance shown a carburetor with a series of intercepting or retarding partitions, $c^2$, dipping into a liquid filling; but, if desired, these partitions can be dispensed with and an absorbent packing or filling saturated with a hydrocarbon liquid used in place thereof.

Other forms of carburetors than those referred to can be employed without departing from the spirit of my invention. From the carburetor the gas passes into the holder, in which it is stored for consumption, or led from the same through pipes into burners. I also propose, however, to take the gas passing from the dialyzer into a gas-holder, and from thence conduct it into carbureting vessels or devices located at the points where the gas is used or consumed.

These carbureting devices may, if desired, be in the form of portable vessels connected directly with the burner.

An illuminating-gas made as above described contains the necessary amount of oxygen to produce a brilliant or luminous flame without having such a proportion of oxygen or mixture of different gases as to make the same dangerous or render it liable to explode.

I am aware that it is not new to vaporize a hydrocarbon liquid in a retort or generator by the application of heat, admixing the resultant hydrocarbon vapor with pure oxygen and consuming the gaseous mixture in specially-constructed burners.

I am also aware that ordinary atmospheric air has been impregnated or combined with hydrocarbon vapors by passing the air through or against a liquid hydrocarbon, causing it to carry off a portion of the same, and holding the hydrocarbon in suspension until the air so carbureted reaches the burner, where it is consumed.

My invention differs essentially from the above-cited processes, and involves the charging of a mixture of oxygen and nitrogen in or about equal proportions with the vapors of a liquid hydrocarbon. A gas obtained in this manner can be conducted through ordinary pipes and consumed in common burners, and the flame produced thereby is both brilliant and smokeless, this result being attained by the elimination of a large proportion of nitrogen from the atmospheric air. Ordinary atmospheric air impregnated with hydrocarbon vapors simply holds the latter in a state of suspension, and causes frequently arise for effecting a deposition or condensation of such vapors in the pipes or conductors.

In my process of admixing hydrocarbon vapors with a gaseous mixture containing a large proportion of oxygen the union or admixture of the hydrocarbon vapors is more perfect and permanent than in illuminating-gases obtained by other carbureting processes.

Having thus described my invention, what I claim as new, and desire to secure by Letters Patent, is—

1. The herein-described method of obtaining an illuminating-gas, consisting in depriving atmospheric air of part of its nitrogen by the process of dialysis and then carbureting the oxygenated air, or charging it with the vapors of a liquid hydrocarbon by bringing said oxygenated air in direct contact with the liquid hydrocarbon, substantially as herein set forth.

2. An apparatus for producing illuminating-gas, consisting of an air-dialyzer, suitable means for passing atmospheric air through the same, and a carburetor, substantially as herein set forth.

3. An apparatus for producing illuminating-gas, consisting of a dialyzer, an exhaust and force pump or its equivalent, a carburetor, and a gas-holder, substantially as herein set forth.

In testimony whereof I affix my signature in presence of two witnesses.

MOR. HERZOG.

Witnesses:
JOHN G. HAVILAND,
M. CALM.